(No Model.) 3 Sheets—Sheet 1.
E. T. WARNER & J. F. CURRY.
ART OF MAKING MORTAR.
No. 473,860. Patented Apr. 26, 1892.
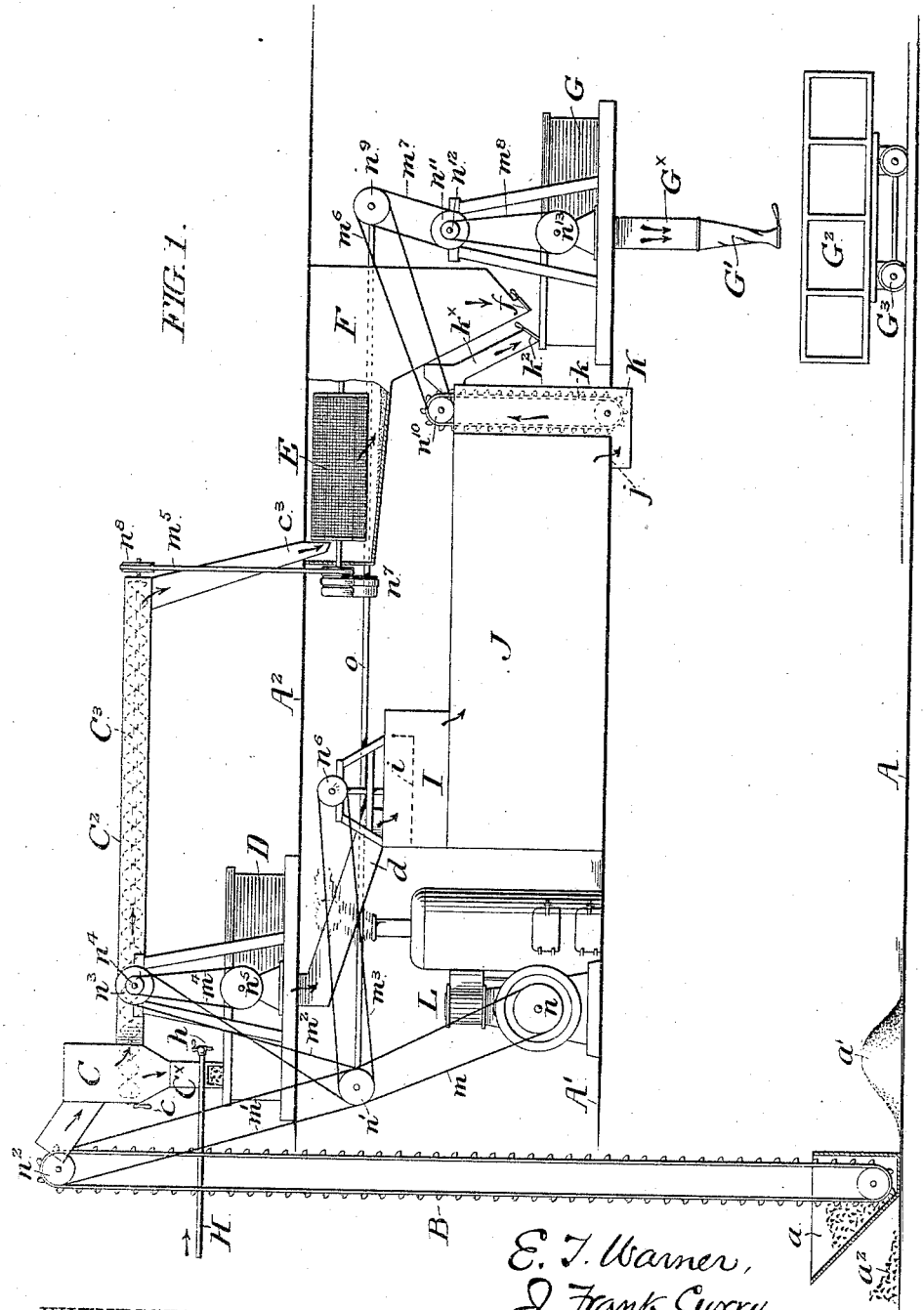
WITNESSES:
R. M. Russell
F. Norman Dixon
INVENTORS:
E. T. Warner,
J. Frank Curry
By their Attorneys,
Wm. C. Strawbridge,
J. Bonsall Taylor (No Model.) 3 Sheets—Sheet 2.
E. T. WARNER & J. F. CURRY.
ART OF MAKING MORTAR.
No. 473,860. Patented Apr. 26, 1892.
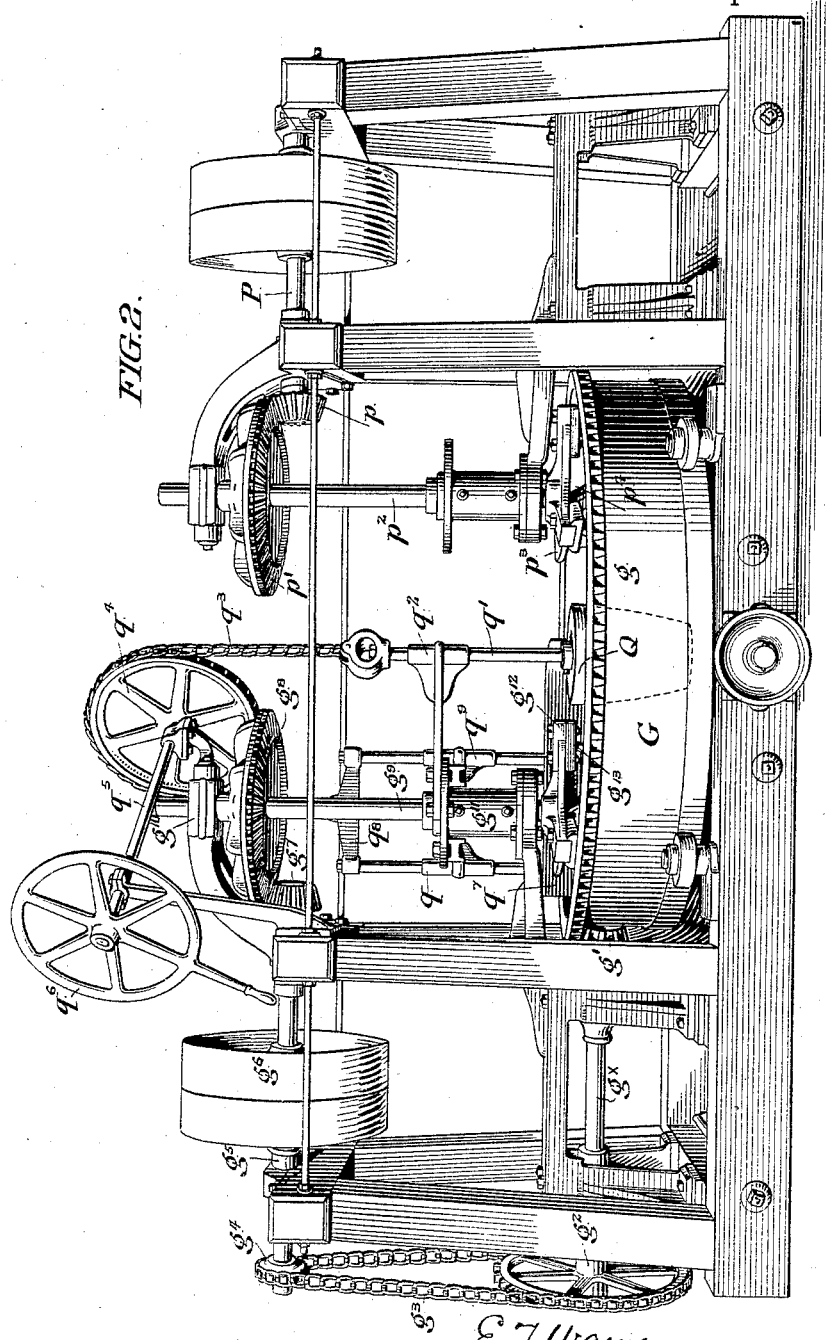
WITNESSES:
R. M. Russell
F. Norman Dixon
INVENTORS:
E. T. Warner,
J Frank Curry,
By Their Attorneys,
Wm C. Strawbridge
J Bonsall Taylor (No Model.) 3 Sheets—Sheet 3.
E. T. WARNER & J. F. CURRY.
ART OF MAKING MORTAR.
No. 473,860. Patented Apr. 26, 1892.
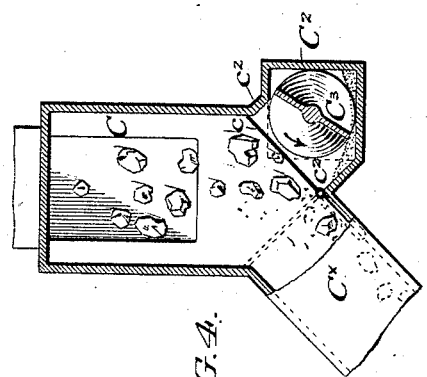
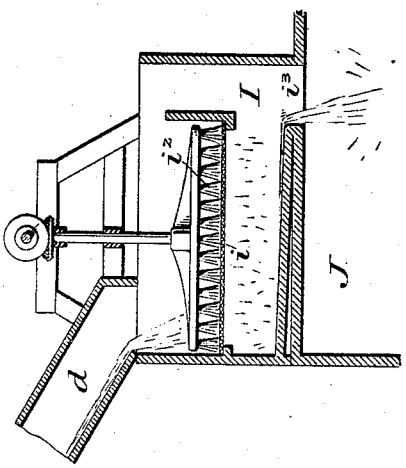
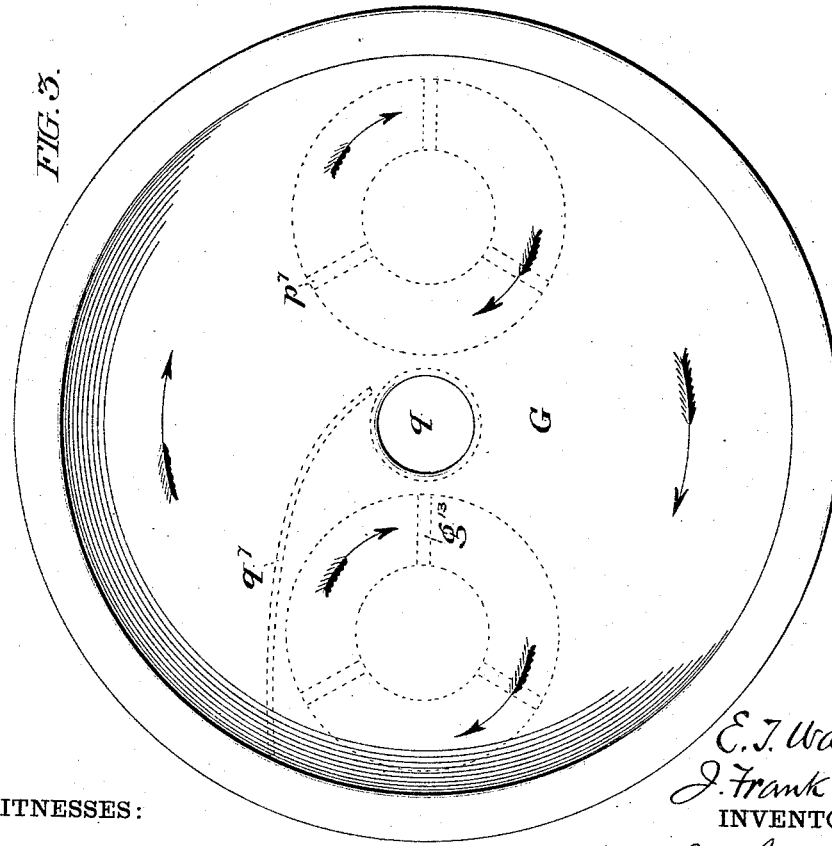
WITNESSES:
R. M. Russell
F. Norman Dixon
E. T. Warner,
J. Frank Curry,
INVENTORS.
By their Attorneys,
Wm. C. Strawbridge,
J. Bonsall Taylor

United States Patent Office.

EDWARD T. WARNER AND JOHN FRANK. CURRY, OF WILMINGTON, DELAWARE, ASSIGNORS TO THE CHARLES WARNER COMPANY, OF SAME PLACE.

ART OF MAKING MORTAR.

SPECIFICATION forming part of Letters Patent No. 473,860, dated April 26, 1892.

Application filed March 19, 1892. Serial No. 425,582. (No model.)

*To all whom it may concern:*

Be it known that we, EDWARD TATNALL WARNER and JOHN FRANKLIN CURRY, both citizens of the United States, and residents of Wilmington, in the county of New Castle, and State of Delaware, have invented certain new and useful Improvements in the Art of Making Mortar, of which the following is a specification.

Our invention is concerned with the production of common mortar in contradistinction to the manufacture of hydraulic mortars or cements. It deals, moreover, with the manufacture of mortar upon a commercial scale and in large quantities, by the aid of mechanical appliances, as opposed to the well known manual manufacture in the street mortar bed, and to operations in no step of which is machinery employed.

In fact, our invention has for its object the commercial production of mechanically-mixed mortar for building and kindred purposes, our improvements comprehending a mode of producing a machine-mixed homogeneous mortar possessing a maximum tensile strength and exceptional smoothness, in an operation which preferably commences with the handling of the raw materials, and which is practically continuous and preferably without manual intervention throughout, and which is conducted by the aid either of such various mechanical appliances as are hereinafter referred to, and which conveniently serve automatically and with certainty and uniformity to produce the ultimate product, or of others mechanically the equivalents thereof.

Broadly stated, our invention comprehends a method of making common mortar in which lime and water in appropriate proportions are first thoroughly mixed by mechanical means so as to form a lime paste—in which the lime paste thereby produced, preferably but not necessarily after having been screened or strained, is stored in bulk in vats or kindred large receptacles and therein retained for a period of time sufficient to insure its slow but thorough digestion, its becoming slowly but finally cold and homogeneous, and its assuming a putty-like or plastic consistency,—and in which the lime paste so digested and cold is in appropriate proportions by mechanical means mixed with sand.

We have discovered that, as a result of the foregoing operation, we obtain a very perfect mortar possessing qualities of strength, smoothness, and homogeneousness, which no other hand-made or machine-made mortar of which we have knowledge has heretofore possessed.

In the conduct of the operation which our improvements comprehend, the lime is very thoroughly slaked with the smallest proportion of water, all particles of core or unslaked lime are preferably eliminated from the lime paste, and the lime paste itself after it has been permitted in bulk to digest slowly and become cold, is admixed with the sand in such proportions that each grain of the latter is nicely coated with the paste, the interstices between the grains being adequately filled and all surplus of lime in the ultimate admixture avoided. The sand and lime, being effectually assimilated by the foregoing operation, form a silicate of lime which possesses greater strength than has heretofore been possessed by any mechanically or manually admixed product of lime and sand, and which sets more quickly. The exceptional strength of our ultimate admixture is, as we believe, due not only to the thoroughness of the mixing operations, but also to the fact that the lime paste, after having been permitted in bulk to slowly digest or season and become cold, is mixed cold with the sand.

In the accompanying drawings we have represented an apparatus conveniently adapted to carry our method into effect. It is, however, to be understood that the form, the construction, and the local relationship, of the various elements of said apparatus which in their assemblage co-operate for the production of the desired result, may be varied at the will of the constructer, and that certain of said elements may, as hereinafter mentioned, be dispensed with.

In the drawings, Figure 1 represents in side elevation an apparatus which we find it convenient to employ. Fig. 2 is a view in perspective of a mortar-mixer which we find well adapted for its purpose. Fig. 3 is a plan view of the revoluble mixing trough of said mortar-mixer. Fig. 4 is a fragmentary, partly sectional, and partly elevational, detail of a two-way chute of the character represented in Fig. 1. Fig. 5 is a side sectional elevation of a sieve or straining chamber through which the lime paste may, if desired, be caused to be passed prior to its deposition in the receiving vat.

Similar letters of reference indicate corresponding parts in all the figures.

In the drawings, A represents the ground floor, A' the second floor, and $A^2$ the third floor of any preferred structure in which our apparatus as an entirety may be supposed erected.

$a$ is a charging chamber, preferably located on the ground floor, into which either sand $a'$, or lime $a^2$, may at will be fed.

B is an endless chain or bucket conveyer conveniently operating to elevate material charged into the charging chamber to above the level of the third floor of the building, and to discharge it conveniently into a two-way receiving chute C preferably located above the level of the upper floor. This chute C which is made as a two-way device simply for convenience, and is provided with a discharging spout $C^x$, through which, when the two-way valve $c$ is in the position represented in Fig. 4, the lime elevated by the conveyer will be discharged into the slaking box or mixer D,—and also with a discharging mouth $c^2$ through which, when the valve $c$ is in the position represented by dotted lines in Fig. 4, sand elevated by the bucket conveyer will be discharged conveniently into the casing $C^2$ of a spiral conveyer or worm $C^3$, the rotation of which will serve to convey the sand throughout the length of the conveyer casing and to discharge it at its distant end through a suitable delivering spout $c^3$, preferably into a rotary or shaking sieve E of cylindric or other preferred character, through which the sand will be strained or sifted, and whence it will gravitate conveniently into a sand bin F, the discharging mouth $f$ of which is controlled by a suitable valve, operative to deliver the sifted sand into the mortar-mixer G, whereof hereinafter.

The slaking box D may be of any preferred form, being, however, conveniently a revolving receiver of the general character of the mortar-mixer hereinafter described, but operative to good effect with but a single mixing arm or set of mixing arms. Into this slaking box the water supply pipe H discharges, and a cock $h$ upon said pipe conveniently serves to regulate the feed of the water into the box. Within the slaking box the lime and water, supplied in the desired proportions, are, as stated, intimately admixed by the operation of any preferred stirring arm, or other device or devices,—and from out of the bottom of said box, conveniently through a central aperture, the slaked lime or lime paste is discharged conveniently through a discharging chute $d$, and preferably through a sieve, or into a straining chamber I in which is contained a sieve $i$, being a wire screen of fine mesh, upon the face of which the slaked lime is discharged and over the face and through the mesh of which it is preferably swept conveniently by a revolving brush $i^2$, the function of which, in connection with the sieve, is to prevent all particles of core or unslaked lime or foreign particles from entering the vat J, in which the lime paste is stored and permitted to remain in bulk for a period of time sufficient to cause it to digest slowly, the lime settling to the bottom and leaving the water upon top to be pumped off, in order that there may remain only a very fine putty-like paste of suitable character for ultimate admixture with the sand. The period within which the mass of lime paste will digest, assume this putty-like consistency, and become, as hereinbefore set forth, cold, varies somewhat with the vat capacity, under conditions with which practical men soon become familiar; but the minimum period within which we, in the use of large vats, have found the paste in proper condition for admixture with sand, has been a week or ten days, and we have even retained it for two or three weeks, and by so doing we have found that the long retention of the heat in, and the gradual cooling of, the mass, insures its thorough digestion and tempering, with the result that the mass when finally cold is both homogeneous and plastic. The vats which we in practice employ are of large size, and each capable of holding a large quantity mass or bulk of the lime paste.

We represent but a single vat in the drawings, but in large plants the vat capacity must be proportionately great.

It is proper to explain that while we have particularized a screening or straining chamber, we do not confine ourselves to any form or application of screen, nor indeed to the use of any screen, as the slaked lime may in many cases be deposited directly and without the intervention of any screening operation, in the vat.

The lime-straining chamber shown in Fig. 5 conveniently discharges through an orifice $i^3$ into the vat J, and from the vat J, as shown in Fig. 1, is a discharge opening $j$, controlled by any suitable valve, through which said vat conveniently discharges into a conveyer chamber K, in which is a bucket conveyer $k$, conveniently vertically erected, by the aid of which the digested lime paste is elevated and discharged into a delivering chute $k^x$, provided for the purpose with a suitable discharge valve $k^2$, and discharging into the mortar-mixer G.

It is not of the essence of the foregoing apparatus that any special machinery should be employed to occasion the operation of the various moving parts:—thus, for instance, the movement of the bucket conveyer B for elevating the raw material, the revolution of the slaking box D in which the lime is mixed with the water and slaked, the movement, when employed, of the sieve E through which the sand is preferably screened, the movement of a brush upon a sieve to strain any foreign particles from the slaked lime when straining is resorted to, the operation of the bucket conveyer $k$ for the discharge of the lime paste into the mortar-mixer, and the revolution of the mortar-mixer itself,—may all be occasioned by any preferred motive power and through any preferred connective mechanism. Simply to indicate a possible and inexpensive way of imparting to these moving elements the desired movement,—we have represented a prime motor L, being a steam, hot air, electric, or other preferred, actuating device, and a series of belts $m$ to $m^8$, operating a series of pulleys $n$ to $n^{13}$,—in certain instances geared through a countershaft and bevel gears $o$,—which it is unnecessary to describe in detail, as they speak for themselves upon Fig. 1 of the drawings, and as their relative arrangement may be indefinitely varied, or other connective or driving devices substituted in their stead, or, in fact, separate motors employed to actuate separately or in preferred combination the various moving parts.

G is the mortar-mixer, which, as shown in Fig. 1, is conveniently provided with a central downwardly discharging spout $G^x$ conveniently terminating in a bag funnel $G'$, controlled by a suitable valve, through which delivery of the ultimate admixture, the mortar which is the commercial product of the apparatus, can be made into, for instance, a delivering box $G^2$ conveniently mounted upon a truck $G^3$ running, if desired, upon a track upon the ground floor. Many forms of mortar-mixing devices may, if desired, be employed, but we find it convenient to employ such a mixing-machine as is that represented in Fig. 2 of the drawings. In that machine the letter G designates a revoluble cylindrical tank, suitably mounted for revolution in any preferred manner, but conveniently provided with a peripheral rack $g$ with which engages a pinion $g'$ on a pinion shaft $g^x$ actuated by a chain wheel $g^2$, driven by a chain $g^3$ from a chain pinion $g^4$ on a driving shaft $g^5$ actuated from any preferred motor by means of a pulley $g^6$. It is obvious that the rotation of the driving shaft through the pulley will occasion a revolution of the mixing tank G. Upon the inner end of the driving shaft $g^5$ which is suitably supported in any preferred manner, is a beveled pinion $g^7$ in engagement with a beveled spur wheel $g^8$ keyed upon a stirring shaft $g^9$, housed in bearings $g^{10}$ $g^{11}$, upon the lower extremity of which shaft is affixed a frame $g^{12}$, which carries a series, conveniently three, of stirring arms $g^{13}$. It is obvious that the rotation of the driving shaft will through the bevel gear $g^7$ $g^8$ occasion the rotation of the stirring shaft and frame and the consequent revolution of stirring arms at a speed proportionate to the speed of the driving shaft and the proportions of the bevel gear.

P is a second driving shaft, preferably the counterpart of the driving shaft $g^5$ and similarly supported and equipped with pulleys, which shaft through a bevel pinion $p$ and beveled spur wheels $p'$ conveniently occasions the revolution of the second stirring shaft $p^2$, which also is conveniently equipped with a frame $p^3$, carrying stirring arms $p^4$, the operation of which is identical with that of the stirring arms $g^{13}$ first described.

Q is a counterbalanced valve which conveniently closes the discharging orifice $q$, Fig. 3, in the bottom of the mixing tank. This valve, which is conveniently in the nature of a puppet valve, has a vertically moving valve-stem $q'$ housed in a slide bearing $q^2$, and its upper extremity is connected with a balance chain $q^3$ working over a chain wheel $q^4$, upon a balance shaft $q^5$, suitably housed in the framework and equipped with a hand wheel $q^6$ to occasion any desired oscillation of the chain wheel. The extremity of the balance chain not connected with the valve stem, is conveniently connected with a curved scraper $q^7$, which serves as a counterbalance of the valve, and which, when the valve is seated, is suspended clear of the floor of the mixing tank, but which, when the valve is unseated, descends into contact with said floor, and serves in the further rotation of the tank to direct its contents into the discharging orifice $q$ of the tank. The scraper itself is conveniently connected with a carrying yoke device $q^8$, housed in slide bearings $q^9$ conveniently supported from or formed as a part of the framework.

The details of the construction of this mortar-mixer are not of the essence of the apparatus as an entirety, as it is obvious that so far as the mortar-mixer is concerned, all that is required is that it should be a suitable mechanically-operated mixing device by the aid of which the digested lime paste and the sand may be thoroughly and intimately admixed, to the end that each grain of sand may become thoroughly coated with the paste and all the interstices between the grains be filled with it.

As already stated, the slaking machine or box D may be a counterpart of the foregoing mortar-mixing machine, or it may be any other form of mixing device in which lime and water are stirred up together automatically as contradistinguised from manually, and from which the lime thereby slaked is caused to pass to a vat.

It will now be apparent that the slaking machine, the settling vat, and the mortar-mixing machine are the only indispensable elements of the apparatus as an entirety.

Having now described an apparatus through the instrumentality of which the operation of mechanically-mixing mortar can be automatically, that is to say without the necessity of manual interference, performed,—we desire once again to emphasize the fact that the special relative arrangement and the special construction of the various elements shown in the accompanying drawings and hereinbefore particularly described, are not of the essence of said apparatus or of the invention.

What we claim and desire to secure by Letters Patent is:

1. The improvement in the art of making mortar, which consists:—first, in mechanically mixing lime and water to produce slaked lime;—second, in retaining in bulk the lime paste thus produced for a time sufficient to insure its slow but thorough digestion, its becoming slowly but finally cold and homogeneous, and its assuming a putty-like or plastic consistency;—and, third, in mechanically mixing the digested lime paste with sand;—substantially as set forth.

2. The improvement in the art of making mortar, which consists:—first, in mechanically mixing lime and water to produce slaked lime;—second, in straining or screening the slaked lime to free it from core and foreign particles;—third, in retaining in bulk the lime paste thus produced for a time sufficient to insure its slow but thorough digestion, its becoming slowly but finally cold and homogeneous, and its assuming a putty-like or plastic consistency;—and, fourth, in mechanically mixing the digested lime paste with sand;—substantially as set forth.

In testimony that we claim the foregoing as our invention we have hereunto signed our names this 16th day of March, A. D. 1892.

E. T. WARNER.
     J. FRANK. CURRY.

In presence of—
 J. BONSALL TAYLOR,
 WM. C. STRAWBRIDGE.